Aug. 29, 1967  T. J. ZILKA ET AL  3,338,266
INFLATION INCITER
Filed April 1, 1964
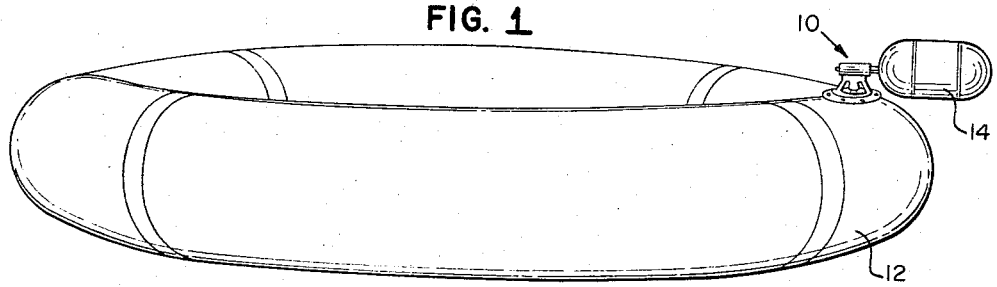
FIG. 1
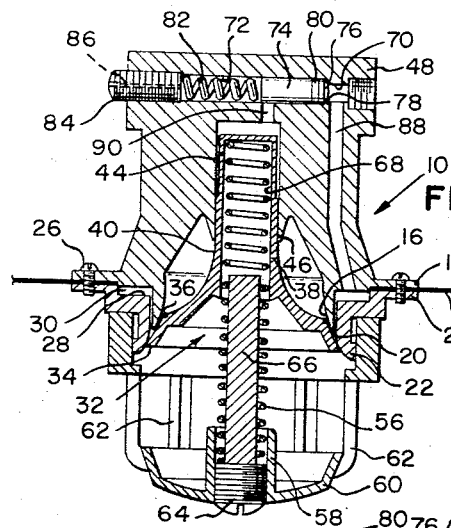
FIG. 3
FIG. 2
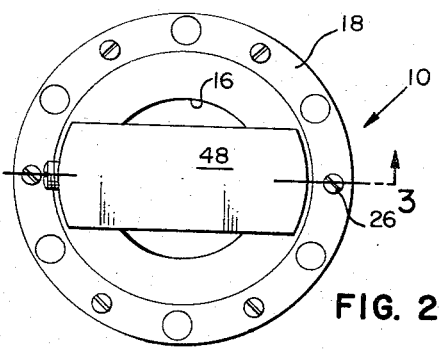
FIG. 5
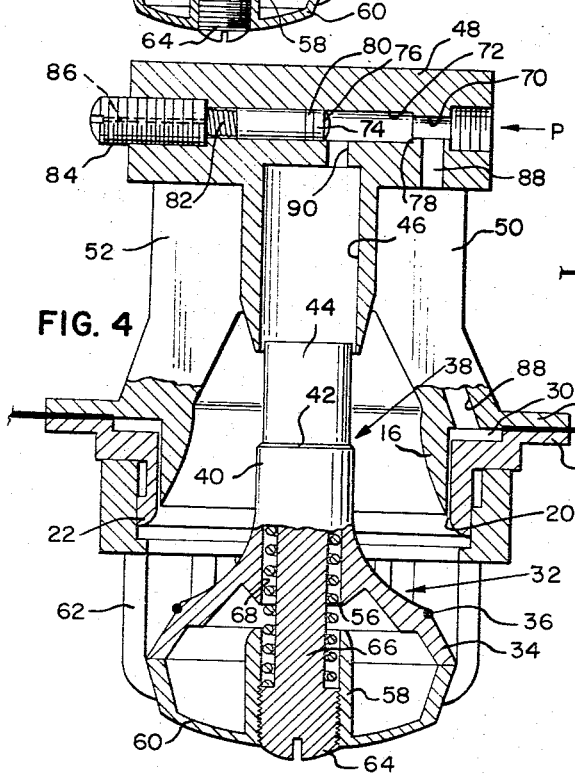
FIG. 4
INVENTORS
THOMAS J. ZILKA
RONALD H. DAY
*Melvin R. Stidham*
ATTORNEYS

3,338,266
INFLATION INCITER
Thomas J. Zilka and Ronald H. Day, Mill Valley, Calif.,
assignors to Adams Company, Sausalito, Calif., a sole
proprietorship of Thomas J. Zilka
Filed Apr. 1, 1964, Ser. No. 356,501
16 Claims. (Cl. 137—604)

This application relates to an inflation inciter and, more particularly, to a valve-operated device adapted to project high velocity gas streams to promote the flow of ambient air for the inflation of non-rigid articles such as life rafts.

Many non-rigid articles such as life rafts, aircraft escape slides, and the like, are best stored aboard an aircraft or vessel in compact, folded condition and inflated when needed by operation of a self-contained source of pressure fluid, such as a small storage tank or bottle of pressurized air, carbon dioxide or other gas. However, when such inflatable articles are of particularly large volume, the gas supply tank must also be of correspondingly large volume, and often the point is reached wherein the stored article is of excessive weight and unwieldy to handle. Others have conceived the principle of employing a small quantity of pressurized fluid and directing its flow so as to incite and promote ambient air with it into the article being inflated and this invention is directed to an application of that principle.

It is, therefore, an object of this invention to provide a compact flow inciter device capable of inciting the flow of a large volume of ambient air with a relatively small quantity of pressurized fluid.

It is a further object of this invention to provide a flow inciter device that projects pressurized fluid at a high rate of flow through a large venturi throat initially, which venturi is reduced in size to compensate for reduction in pressure and flow rate.

It is a further object of this invention to provide a flow promoter valve that is efficient and reliable in operation and relatively economical to manufacture.

In carrying out this invention, we provide a flow inciter device having a central venturi flow passage portion with means around the outside to secure it in an opening in a life raft or other inflatable article. An annular nozzle extends around the orifice to project a jet of fluid therethrough at a high velocity to accelerate ambient air through the passage and draw additional air into the low pressure zone created. The orifice is adapted to be closed by a bell-shaped poppet valve that is urged axially into sealing relationship with the venturi by means of a strong spring. The portion of the valve projecting toward the inlet end of the venturi is of reduced diameter to form a trailing piston of enlarged diameter and a leading piston of reduced diameter both of which are extended into a cylinder carried on the valve body when the poppet valve is in closed position. Fluid conduits connect the source of pressure fluid to both the annular nozzle and the cylinder initially to drive the piston down with a force sufficient to carry the enlarged piston out of the cylinder and provide a clearance around the reduced piston through which a second stream of air projects through the venturi. Then, as the pressure subsides, the spring forces the piston back into the cylinder until the enlarged portion enters to shut off most of the flow in the central area while fluid continues to project out of the annular nozzle. Finally, when the pressure reaches a minimum level, a check valve in the fluid conduit prevents further flow to the central cylinder permitting the pistons to extend fully into the cylinder and force the poppet valve into sealing engagement with the venturi on the intake side of the annular nozzle. Flow through the annular nozzle will continue until the pressure in the inflatable article equals that in the pressure fluid storage bottle. Other objects and advantages of this invention will become apparent from the description following when read in conjunction with the accompanying drawings, wherein:

FIG. 1 is a view in perspective of a life raft with a valve attachment embodying features of this invention;

FIG. 2 is a top plan view of an air flow inciter embodying features of this invention;

FIG. 3 is a section view taken along line 3—3 of FIG. 2; and

FIGS. 4 and 5 are views partially cut away showing the valve in fully opened and partially opened stages, respectively.

Referring momentarily to FIG. 1, the air promoter valve of this invention 10 is shown mounted on non-rigid inflatable article such as a life raft 12, the inflation thereof having been incited by flow of pressure fluid from a source 14 in a manner hereinafter to be described. Of course, the life raft is only a typical installation in which this invention may be applied but, generally, it is useful in non-rigid articles of relatively large volume that desirably are inflated at a very rapid rate.

Referring now to FIGS. 2 to 4, the essential elements of this invention include a venturi flow duct 16 carrying a radial flange 18 adapted to extend beyond the edge of an opening in the inflatable article 12 with the venturi duct 16 opening into the article. Around the inner surface of the venturi 16 is an annular nozzle 20 which is formed by a complementary member 22 having an inner surface forming a continuation of the outward flare to constitute the delivery end of the venturi. The delivery end portion 22 also has an integral flange 24 which may be secured to the flange 18 by suitable means such as screws 26 to clamp the edges of the inflatable article between them in sealing relationship. The upper portion of the member 22 is stepped downward at 28 below the plane of the flange 24 in order to provide an annular passage 30 communicating directly with the annular nozzle 20.

The venturi 16 is adapted to be closed against fluid flow by means of a poppet-type valve 32 having a generally frustro-conical skirt portion 34 around which is carried a resilient seal 36 of a diameter to engage the venturi 16 in an annular sealing contact at a point on the intake side of the nozzle opening 20, i.e., above the nozzle. Integral with the valve closure member 32 is a piston extension 38 having an enlarged trailing end 40 merging at a shoulder 42 into a reduced leading portion 44. The enlarged trailing portion 40 is of a diameter to fit snugly within a cylinder 46 opening downward from a pressure fluid intake manifold 48 supported above the venturi duct on suitable leg members 50 and 52. Consequently, the leading portion 44 fits within the cylinder 46 with an annular clearance that will permit flow of fluid around it as will hereinafter be described. As shown clearly in FIGS. 3, 4 and 5 the trailing piston portion 40 flares outward at 54 to merge smoothly into the frusto-conical skirt 34.

The valve 32 is urged into closed position by means of a strong compression spring 56 extending between a socket 58 carried on the bottom plate 60 of a cage formed by depending support arms 62. Preferably, the socket 58 is internally threaded to accommodate the threaded end 64 of a spring guide rod 66 which prevents radial displacement of the spring 56 and the spring is similarly restrained at the other end by accommodation within a bore 68 extending into the piston portion 38 of the poppet valve 32. The guide rod 66 besides supporting the spring 56 serves as a stop to limit the downward movement of the valve 32. The threaded end 64 affords a means for adjusting the level of stop and preferably the full open position of the valve is as shown in FIG. 4 wherein the poppet valve 34 and the bottom cup 60 form a substantially continuous curved surface for smooth flow of air.

The pressure fluid intake manifold 48 is bored at 70 to provide an inlet passageway for pressure fluid from the source 14 (FIG. 1) and is counterbored at 72 to accommodate slidably a control check valve 74 having a resilient seal 76 at the end thereof to seat against the shoulder 78 at the end of the bore 70. Preferably, an O-ring seal 80 or the like is provided around the body of the valve member 74 in order to prevent leakage around it. The valve 74 is biased into closed position by a compression spring 82, the strength of which is adjusted by a threaded screw 84 that is provided with an axial vent 86 to prevent entrapment of air behind the valve member 74. Communicating with the inlet passageway 70 are outlet ducts 88 and 90 which open into the annular delivery duct 30 and the cylindrical chamber 46, respectively.

In FIG. 3, the valve is shown in its closed position with the spring 56 forcing the resilient seal 36 on the poppet valve 32 firmly against the flared venturi 16 to seal against any flow of fluid through the venturi 16.

Then, when it is desired to inflate an article such as the life raft 12, a source of pressure fluid P is introduced through inlet conduit 70 by operation of any suitable valve means (not shown) associated with the high pressure air bottle 14. The pressure within the air bottle is sufficient first to force the check valve 74 back in the bore 72 to open both ducts 90 and 88, and then as the fluid enters cylindrical chamber 46, to drive the piston 38 down to the position shown in FIG. 4. In certain installations an air bottle pressure of 3,000 p.s.i. has been found satisfactory but the invention is not so limited. The dimensions and proportions of the inciter may be adjusted to operate successfully over a wide range of supply pressures. With the piston in this depressed position, the enlarged trailing portion 40 thereof is completely free of the cylinder 46 and a small clearance exists around the smaller piston portion 44 through which the pressure fluid can exit at high velocity. Thus, an annular jet sheet is projected through the clearance around the upper reduced portion 44 to travel down along the flare 54 of the valve and through the venturi throat between the poppet valve 32 and the venturi passage 16. At the same time, the pressure fluid flowing down into inlet duct 88 in the leg 50 enters the annular chamber 28 to flow out of the annular nozzle 20 and form a concentric jet sheet around the outside of the venturi throat. It is to be noted in FIG. 4 that during the initial operation of the inflation inciter 10 while the poppet valve 32 is displaced downward to its lowermost position, the throat passageway between the valve and the venturi surface 16 is of maximum cross-section.

As the concentric jet streams project from around the upper piston 44 and through the annular nozzle 20 they accelerate the air between them across the throat of the venturi to induce a low pressure region at the throat into which additional atmospheric air rushes.

Then, after the pressure of the incoming fluid P reduces to a predetermined value, the spring 56 tends to overcome the force on the smaller piston 44 and raises the valve 32 until the larger trailing piston 40 engages the cylindrical chamber to the position in FIG. 5. For all practical purposes this stops all but a minimal amount of flow around the piston and, essentially, the only jet stream is that emanating from the annular nozzle 20. However, in the position of the poppet valve 32 in FIG. 5 the frustro-conical skirt 34 has moved up to a point adjacent the lower end of the venturi 16 to reduce the size of the throat materially so that the flow velocity will be maintained at a high level, accelerating ambient air and continuing to produce a low pressure region into which more atmospheric air rushes. A third stage in the operation is reached when the pressure P is reduced to a value wherein the small spring 82 behind the check valve overcomes the force of the fluid to bias the check valve 74 against the shoulder 78 and shut off all further flow to the cylindrical chamber 46. At this point, the spring 56 can drive the piston into its fully retracted position, as shown in FIG. 3 wherein the main poppet valve 32 is firmly sealed so that no more ambient air can be brought into the inflated article 12 and, more significantly, air in the inflated article cannot escape. Of course, as long as there is any pressure differential between the pressurized bottle source 14 and the raft 12, fluid will continue to flow through the duct 88 and out through the annular nozzle which, with the main valve 32 closed, is disposed below the seal 36. When a state of equilibrium is reached, there will be no further flow and both vessels will be at the same pressure. In test installations the inflation pressures with an initial pressure of 3,000 p.s.i. have been in the range from 2 to 10 p.s.i. but there is no limit to the final pressure within the scope of this invention except as governed by the supply pressure and the design configuration.

With the check valve 74 sealed against the shoulder 78 and sealed around its periphery by means of the seal 80 there is no way for fluid within the inflated vessel 12 to escape back through the duct 88 and out through the duct 90 and around the piston 38.

While this invention has been described in connection with preferred embodiments thereof, it is to be understood that modifications and changes therein may be made by those skilled in the art without departing from the spirit and scope of this invention as defined by the claims appended hereto.

Having described our invention, we claim:
1. An air flow inciter comprising:
  a tubular flow passageway having open, relatively high flow capacity, intake and delivery ends,
  the inner surface of said passageway being configurated as a venturi orifice wherein the cross-section of said passageway downstream of said intake end is reduced to a restricted diameter smaller than that of said intake end and increases gradually in an outward flare toward said delivery end,
  first nozzle means directed downstream and opening into said passageway upstream of the restricted diameter portion thereof,
  annular nozzle means around said passageway directed downstream and opening into said inner surface downstream of said restricted diameter portion,
  a pressure fluid inlet adapted to be connected to a source of pressure fluid,
  duct means connecting said fluid inlet to said first and said annular nozzles,
  a valve closure member cooperatively associated with means at the delivery end of said flow passageway and movable between open and closed positions, respectively, to enable and prevent flow therethrough,
  a pressure-responsive member connected to said valve closure member to move it between said open and closed positions, a valve actuating conduit connected to said pressure fluid inlet to expose said pressure responsive member to said pressure fluid and thereby bias said valve closure member toward open position, and yieldable means biasing said valve closure member toward closed position.

2. The air flow inciter defined by claim 1 including:
a vessel forming a cylindrical chamber carried on said passageway with the axis thereof in alignment with said venturi and with an open end thereof disposed toward said delivery end of the venturi,
a piston member carried on said valve closure member slidably received in said cylindrical chamber,
a valve actuating conduit communicating between said pressure fluid inlet and said cylindrical chamber, and
yieldable means biasing said valve closure member toward closed position.

3. The air flow inciter defined by claim 2, including:
a check valve in said valve actuating conduit conditioned to open said conduit by action of fluid pressure against it, and
a spring biasing said check valve closed.

4. The air flow inciter defined by claim 3, including:
an annular resilient seal member of said valve closure member engageable with said venturi-forming inner surface on the intake side of said annular nozzle means.

5. The air flow inciter defined by claim 2 wherein:
said piston member has a leading portion of reduced diameter and a trailing portion of an enlarged diameter to fit snugly within said cylindrical member,
said first nozzle comprising the clearance within said cylindrical chamber around said portion of reduced diameter,
said yieldable means being overcome by pressure in said cylindrical chamber above a predetermined level to force the trailing portion of said cylinder out of said chamber and permit fluid in said chamber to flow out through said first nozzle.

6. The air flow inciter defined by claim 5 including:
a check valve in said valve actuating conduit conditioned to open said conduit by action of fluid pressure against it, and
a spring biasing said check valve closed,
said spring being overcome by pressure in said valve actuating conduit below said predetermined level.

7. The air flow inciter defined by claim 6 including:
an annular resilient seal member on said valve closure member engageable with said venturi-forming inner surface on the intake side of said annular nozzle means.

8. The air flow inciter defined by claim 1 including:
a vessel forming a cylindrical chamber carried in alignment with said flow passageway with an open end thereof disposed adjacent the intake end of said flow passageway and directed toward said delivery end thereof,
a piston member fixedly carried on said valve closure member and received in said cylindrical chamber for axial movement therealong to move said valve closure member therewith between open and closed positions,
surface portions extending from said piston member and flaring outward to merge with said valve closure member,
a valve actuating conduit communicating between said pressure fluid inlet and said cylindrical chamber,
said piston member being conditioned to be biased outward of said cylindrical chamber by pressure fluid in said cylindrical chamber to move said valve closure member toward open position,
said first nozzle comprising a radial clearance between said piston and said chamber through which pressure fluid biasing said piston may simultaneously flow around it along said surface portions through said flow passageway, and
yieldable means biasing said valve towards closed position.

9. The air flow inciter defined by claim 8 wherein:
said piston member has a leading portion of reduced diameter and a trailing portion of enlarged diameter to fit snugly within said cylindrical chamber,
said yieldable means being overcome by pressure in said cylindrical chamber above a predetermined level to force the trailing portion of said cylinder out of said chamber and permit fluid in said chamber to flow out around said leading portion.

10. The air flow inciter defined in claim 9 including:
a check valve in said valve actuating conduit conditioned to open said conduit by action of fluid pressure against it, and
a spring biasing said check valve closed,
said spring being overcome by pressure in said valve actuating conduit below said predetermined level.

11. The air flow inciter defined by claim 8, including:
an annular resilient seal member on said valve closure member engageable with said venturi-forming surface on the intake side of said annular nozzle means.

12. The air flow inciter defined by claim 9 including:
a frusto-conical skirt member depending from said valve closure member,
said skirt member being disposed and arranged to move into radial alignment with said delivery end of the venturi when pressure in said cylindrical chamber falls below said predetermined level to permit said trailing portion of the piston member to enter snugly within said cylindrical chamber.

13. The air flow inciter defined by claim 12, including:
an annular resilient seal member on said valve closure member engageable with said venturi-forming surface on the intake side of said annular nozzle means.

14. An air flow inciter comprising:
a tubular flow passageway having open intake and delivery ends,
a valve closure member cooperatively associated with the delivery end of said passageway and movable axially between open and closed positions, respectively to permit and prevent flow of fluid therethrough,
a vessel forming a cylindrical chamber carried in alignment with said flow passageway with an open end thereof disposed adjacent the intake end of said passageway and directed toward said delivery end of the passageway,
a piston member fixedly carried on said valve closure member and received in said cylindrical chamber for axial movement therealong to move said valve closure member therewith between open and closed positions,
surface portions extending from said piston member and flaring outward to merge with said valve closure member,
a pressure fluid inlet for connection to a source of pressure fluid,
a valve actuating conduit communicating between said inlet and said cylindrical chamber,
said piston member being conditioned to be biased outward of said cylindrical chamber by pressure fluid in said cylindrical chamber to move said valve closure member toward open position,
said first nozzle comprising a radial clearance between said piston and said chamber through which pressure fluid biasing said piston member may simultaneously flow around it along said surface portions through said delivery end, and
yieldable means biasing said valve closure member toward closed position.

15. The air flow inciter defined by claim 14 wherein:
said piston member has a leading portion of reduced diameter with said radial clearance surrounding it and a trailing portion of enlarged diameter to fit snugly within said cylindrical chamber, said yieldable means being overcome by pressure in said cylindrical chamber above a predetermined level to force the trailing portion of said cylinder out of said chamber and permit fluid in said chamber to flow out around said leading portion.

16. The air flow inciter defined by claim 15 including:
a check valve in said valve actuating conduit conditioned to open said conduit by action of fluid pressure against it, and
a spring biasing said check valve closed,
said spring being overcome by pressure in said valve actuating conduit below said predetermined level.

References Cited

UNITED STATES PATENTS

| 1,901,797 | 3/1933 | Black | 103—263 |
| 2,444,717 | 7/1948 | Allen | 9—11 |
| 2,794,447 | 6/1957 | Spitz | 137—604 |
| 3,010,232 | 11/1961 | Skakel et al. | 103—262 X |

FOREIGN PATENTS 196,366  3/1958  Austria.

WILLIAM F. O'DEA, *Primary Examiner.*

D. H. LAMBERT, *Assistant Examiner.*